Patented Jan. 12, 1937

2,067,725

UNITED STATES PATENT OFFICE 2,067,725

AZO DYES FOR ACETATE SILK AND THEIR PRODUCTION

Heinrich Ohlendorf and Hans Lange, Dessau in Anhalt, Germany, assignors to General Aniline Works, Inc., New York, N. Y., a corporation of Delaware No Drawing. Application December 4, 1934, Serial No. 755,878. In Germany December 19, 1933

12 Claims. (Cl. 260—38.5)

Our present invention relates to new azo dyes which correspond to the general formula

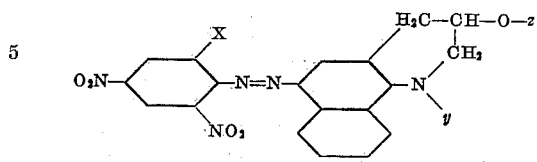

wherein $x$ means either chlorine or bromine, $y$ stands for hydrogen, alkyl, or hydroxyalkyl and $z$ for hydrogen or alkyl. In this formula the naphthalene radicle may be substituted by halogen.

Another object of our invention is the process for manufacturing these new dyes.

As may be seen from the formula given above, our dyes are characterized by the 3-hydroxytetrahydronaphthoquinoline radicle of the formula

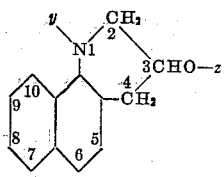

contained as azo component in these dyes. In this formula and in the formulae following hereafter $y$ means hydrogen, alkyl or hydroxyalkyl; $z$ stands for hydrogen or alkyl. These tetrahydronaphthoquinoline derivatives can be manufactured by treating 1-aminonaphthalene or 1-alkyl or hydroxyalkylaminonaphthalene with epichlorhydrine and by converting the 1(γ-chloro-β-hydroxypropylamino)-naphthalene of the formula

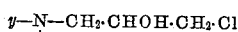
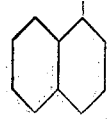

into the corresponding tetrahydroquinoline compound by heating it in the presence of an organic solvent to a higher temperature. By this process the tetrahydrohydroxyquinoline nucleus is formed with evolution of hydrochloric acid; perhaps a glycide of the formula

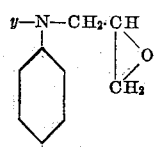

is formed as an intermediate product which forms the end-product according to the equation

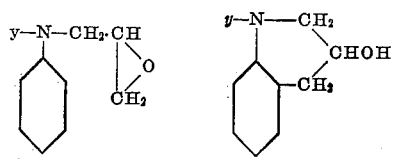

If desired, the hydroxy group in the 3-position may be etherified in the usual manner, for instance, by the treatment with dimethyl sulfate. In this process, it is not necessary to separate the condensation product of α-naphthylamine and epichlorhydrine, but the further condensation to form the hydroxyquinoline nucleus may be carried out immediately after the first condensation.

The following examples serve to illustrate our invention, the parts being by weight:—

*Example 1.*—29 parts of 6-bromo-2.4-dinitro-1-aminobenzene are introduced, while stirring, at about 50 to 60° C. into nitrosyl sulfuric acid obtained from 7 parts of sodium nitrite and 120 parts of sulfuric acid of 66° Bé. strength. Then the mixture is poured on ice and thus diluted. The solution containing the diazo compound as sulfuric acid salt is allowed to run, if necessary after filtration, into a cold solution of 22 parts of 1.2.3.4-tetrahydro-3-hydroxy-α-naphthoquinoline hydrochloride. This compound is obtainable, as described above, by acting with epichlorhydrine upon 1-aminonaphthalene, the free base recrystallized from benzene melting at 152° C. For hastening the coupling, sodium acetate is added until coupling is complete. The finished dye dyes acetate silk very clear greenish blue tints of good fastness.

*Example 2.*—29 parts of 6-bromo-2.4-dinitro-1-aminobenzene are diazotized as indicated in Example 1 and coupled with 27 parts of 1-hydroxyethyl - 3 - hydroxy - 1.2.3.4 - tetrahydro - α-naphthoquinoline of the formula

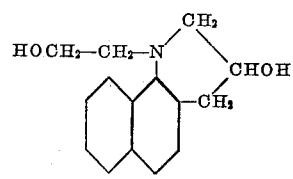

This azo component is obtainable by treating 1.2.3.4-tetrahydro-3-hydroxy - α - naphthoquinoline with ethylene oxide. The free base recrystallized from benzene, melts at 130 to 131° C.

The dye recovered as usual dyes acetate silk greenish blue tints.

*Example 3.*—The diazo compound obtained by diazotizing 29 parts of 6-bromo-2.4-dinitro-1-aminobenzene with the corresponding quantity of nitrosyl sulfuric acid is introduced, while stirring, into a solution containing a mineral acid of 25 parts of 10-chloro-1.2.3.4-tetrahydro-3-hydroxy-α-naphthoquinoline. This base melting at 116° C. is obtainable by treating 8-chloro-1-aminonaphthalene with epichlorhydrine in the presence of chlorobenzene. The dye obtained dyes acetate silk clear greenish blue tints.

*Example 4.*—The diazo solution of 29 parts of 6-bromo-2.4-dinitro-1-aminobenzene is united, while stirring, with an acid solution containing 23.5 parts of 1.2.3.4-tetrahydro-3-methoxy-α-naphthoquinoline of the formula

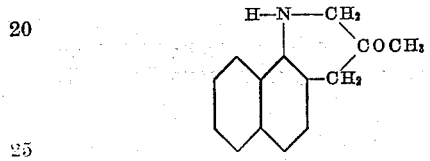

The dye, finished in the usual manner, dyes acetate silk clear greenish blue tints.

It is obvious that our invention is not limited to the foregoing examples or to the specific details given therein. Thus, for instance, 6-bromo-2.4-dinitro-1-aminobenzene may be substituted by the corresponding 6-chloro-2.4-dinitro-1-aminobenzene, whereby dyes are obtained having the same qualities. Furthermore, an azo component of the kind described may be used being substituted at N by another hydroxyalkyl or alkyl radicle than that mentioned in Example 2. Finally, the hydroxy group in the 3-position may be etherified (cf. Example 4) by ethyl or another higher alcohol.

What we claim is:—

1. The dyes corresponding to the general formula—

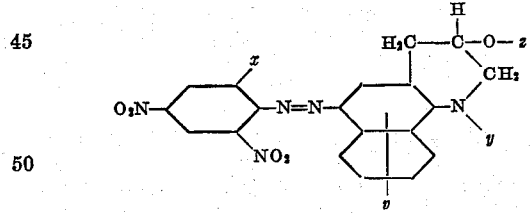

in which $x$ is a substituent selected from the group consisting of chlorine and bromine, $y$ stands for a radicle selected from the group consisting of hydrogen, alkyl, and hydroxyalkyl, $z$ for a radicle of the group consisting of hydrogen and alkyl and $v$ is an element of the group consisting of hydrogen and halogen, said dyes dyeing acetate silk clear blue tints.

2. The dyes corresponding to the general formula—

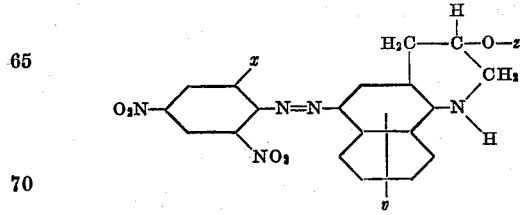

in which $x$ is a substituent selected from the group consisting of chlorine and bromine, $z$ stands for a radicle of the group consisting of hydrogen and alkyl and $v$ is an element of the group consisting of hydrogen and halogen, said dyes dyeing acetate silk clear blue tints.

3. The dyes corresponding to the general formula—

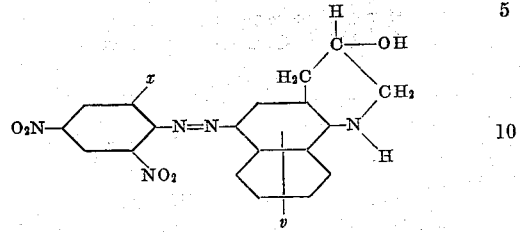

in which $x$ is a substituent selected from the group consisting of chlorine and bromine, and $v$ is an element of the group consisting of hydrogen and halogen, said dyes dyeing acetate silk clear blue tints.

4. The dye which corresponds to the formula—

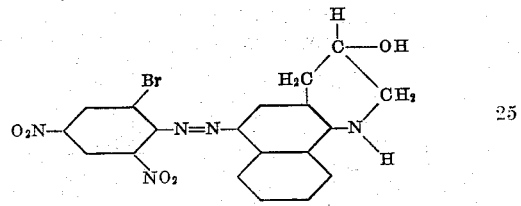

which dyes acetate silk very clear greenish blue tints of good fastness.

5. The dye corresponding to the formula—

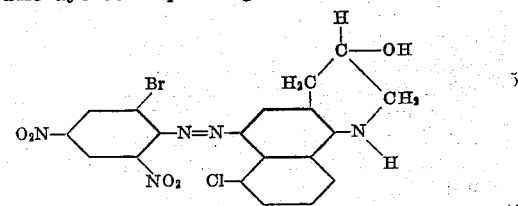

which dyes acetate silk very clear greenish blue tints of good fastness.

6. The dye corresponding to the formula—

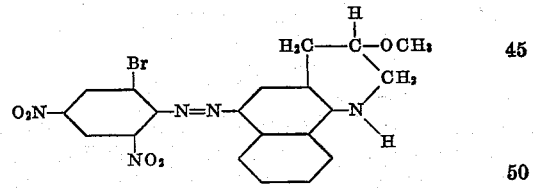

which dyes acetate silk very clear greenish blue tints of good fastness.

7. The process which comprises diazotizing an amine of the general formula—

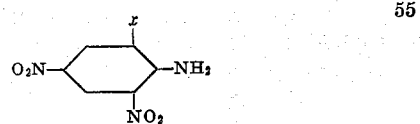

wherein $x$ is a substituent selected from the group consisting of chlorine and bromine, and coupling the diazo compound with a tetrahydronaphthoquinoline of the general formula—

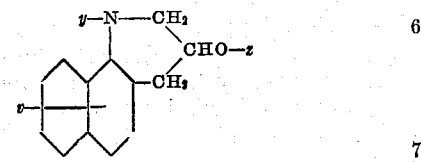

wherein $y$ stands for a radicle selected from the group consisting of hydrogen, alkyl, and hydroxyalkyl, $z$ for a radicle of the group consisting of hydrogen and alkyl and $v$ is an element of the group consisting of hydrogen and halogen.

8. The process which comprises diazotizing an amine of the general formula—

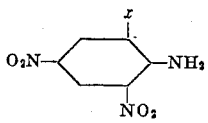

wherein $x$ is a substituent selected from the group consisting of chlorine and bromine, and coupling the diazo compound with a tetrahydronaphthoquinoline of the general formula—

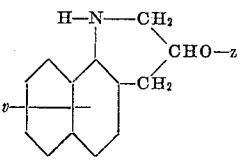

wherein $z$ stands for a radicle of the group consisting of hydrogen and alkyl and $v$ is an element of the group consisting of hydrogen and halogen.

9. The process which comprises diazotizing an amine of the general formula—

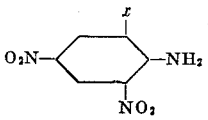

wherein $x$ is a substituent selected from the group consisting of chlorine and bromine, and coupling the diazo compound with a tetrahydronaphthoquinoline of the general formula—

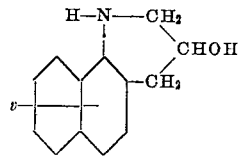

wherein $v$ is an element of the group consisting of hydrogen and halogen.

10. The process which comprises diazotizing 6-bromo-2.4-dinitro-1-aminobenzene and coupling the diazo compound with 1.2.3.4-tetrahydro-3-hydroxy-α-naphthoquinoline.

11. The process which comprises diazotizing 6-bromo-2.4-dinitro-1-aminobenzene and coupling the diazo compound with 10-chloro-1.2.3.4-tetrahydro-3-hydroxy-α-naphthoquinoline.

12. The process which comprises diazotizing 6-bromo-2.4-dinitro-1-aminobenzene and coupling the diazo compound with 1.2.3.4-tetrahydro-3-methoxy-α-naphthoquinoline.

HEINRICH OHLENDORF.
HANS LANGE.